(12) United States Patent
Hayslett et al.

(10) Patent No.: US 9,796,277 B2
(45) Date of Patent: Oct. 24, 2017

(54) ELECTRIC BIKE EXTENDED RANGE BATTERY POWER ELECTRONICS AND CONTROL

(71) Applicant: GM Global Technology Operations LLC, Detroit, MI (US)

(72) Inventors: Steven L. Hayslett, Troy, MI (US); Constantin C. Stancu, Auburn Hills, MI (US); Jorge G. Cintron-Rivera, Shelby Township, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 113 days.

(21) Appl. No.: 14/633,878

(22) Filed: Feb. 27, 2015

(65) Prior Publication Data

US 2016/0250937 A1    Sep. 1, 2016

(51) Int. Cl.

| | |
|---|---|
| *B60L 9/00* | (2006.01) |
| *B60L 11/00* | (2006.01) |
| *G05D 1/00* | (2006.01) |
| *G05D 3/00* | (2006.01) |
| *G06F 7/00* | (2006.01) |
| *G06F 17/00* | (2006.01) |
| *B60L 11/18* | (2006.01) |
| *B62M 6/90* | (2010.01) |
| *H01M 10/42* | (2006.01) |
| *H01M 10/44* | (2006.01) |
| *H01M 10/46* | (2006.01) |

(52) U.S. Cl.
CPC ....... *B60L 11/1811* (2013.01); *B60L 11/1822* (2013.01); *B60L 11/1864* (2013.01); *B62M 6/90* (2013.01); *H01M 10/425* (2013.01); *H01M 2220/20* (2013.01)

(58) Field of Classification Search
CPC .......... B60L 11/1811; B60L 15/20; H02J 7/00
USPC ............................................ 701/22; 320/101
See application file for complete search history.

(56) References Cited

U.S. PATENT DOCUMENTS

| | | | |
|---|---|---|---|
| 8,378,623 B2 | 2/2013 | Kusch et al. | |
| 8,441,228 B2 | 5/2013 | Brabec | |
| 8,450,974 B2 | 5/2013 | Stewart et al. | |
| 8,803,470 B2 | 8/2014 | Stewart et al. | |
| 8,818,601 B1 | 8/2014 | GV et al. | |
| 8,829,722 B2 | 9/2014 | Kusch et al. | |
| 2009/0015193 A1* | 1/2009 | Esaka | B60K 6/28 320/103 |
| 2012/0041624 A1* | 2/2012 | Stewart | H01M 16/006 701/22 |
| 2013/0049684 A1 | 2/2013 | Kusch et al. | |
| 2013/0063072 A1* | 3/2013 | Shirasaka | H01M 8/0488 320/101 |
| 2013/0307489 A1 | 11/2013 | Kusch et al. | |

(Continued)

OTHER PUBLICATIONS

Canadian Office Action dated Mar. 1, 2017 ; Application No. 2,921,632; Applicant:GM Global Technology Operations LLC.; 7 pages.

*Primary Examiner* — Mahmoud Ismail
(74) *Attorney, Agent, or Firm* — BrooksGroup

(57) ABSTRACT

A number of variations may include a product comprising: an extended range battery system for an electric bicycle comprising a first battery system and a second battery system, and wherein direct current biasing is utilized between the first battery system and the second battery system to extend the range of the extended range battery system.

3 Claims, 4 Drawing Sheets

(56) References Cited

U.S. PATENT DOCUMENTS

2014/0028267 A1    1/2014  Lee
2014/0084868 A1*   3/2014  Yun ..................... H02J 7/0063
                                                        320/118
2014/0091751 A1    4/2014  Workman et al.

* cited by examiner

ELECTRIC BIKE EXTENDED RANGE BATTERY POWER ELECTRONICS AND CONTROL

TECHNICAL FIELD

The field to which the disclosure generally relates to includes electric bicycles.

BACKGROUND

An electric bicycle may include a battery.

SUMMARY OF ILLUSTRATIVE VARIATIONS

A number of variations may include a product comprising: an extended range battery system for an electric bicycle comprising a first battery system and a second battery system, and wherein direct current biasing is utilized between the first battery system and the second battery system to extend the range of the extended range battery system.

A number of variations may include a method for an extended range battery system for an electric bicycle comprising utilizing direct current biasing between a first battery system and a second battery system to extend the range of the extended range battery system.

Other illustrative variations within the scope of the invention will become apparent from the detailed description provided hereinafter. It should be understood that the detailed description and specific examples, while disclosing variations within the scope of the invention, are intended for purposes of illustration only and are not intended to limit the scope of the invention.

BRIEF DESCRIPTION OF THE DRAWINGS

Select examples of variations within the scope of the invention will become more fully understood from the detailed description and the accompanying drawings, wherein.

DETAILED DESCRIPTION OF ILLUSTRATIVE VARIATIONS

The following description of the variations is merely illustrative in nature and is in no way intended to limit the scope of the invention, its application, or uses.

Figure 1:
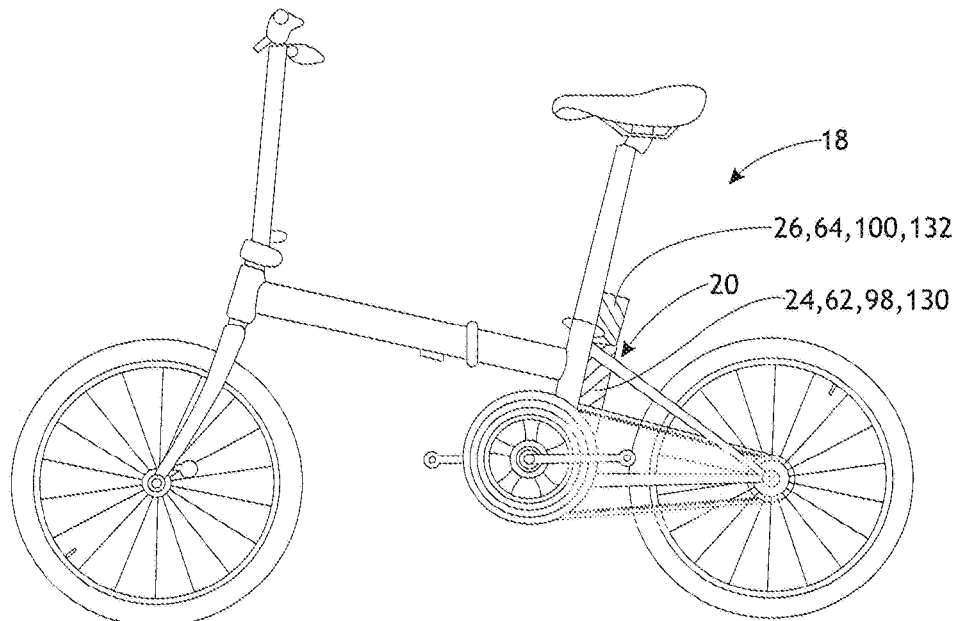
FIG. 1 illustrates an electric bicycle according to a number of variations.

FIG. 1 illustrates a number of variations which may include an electric bicycle 18. An electric bicycle 18 may include an extended range battery system 20. The extended range battery system 20 may allow for extended life or range of the battery system 20 so that the electric bicycle 18 may be powered for an extended period before charging of the system 20 is required. The extended range battery system 20 may increase drive system performance by minimizing electrochemical energy conversion processes. The extended range battery system 20 may include a first battery system 24, 62, 98, 130 which may be integrated onto the bicycle 18. A secondary battery system 26, 64, 100, 132 may then be removably attached to the first battery system 24, 62, 98, 130 and electric bicycle 18 if extended range of the battery system 20 is desired. This may allow for removal of the secondary battery system 26, 64, 100, 132 where extended range of the battery system 20 may not be desired and/or to remove excess weight.

In a number of variations, an extended range battery system 20 may utilize direct current (DC) biasing between a high voltage (HV) battery 28, 66, 102 and a low voltage (LV) battery 30, 68, 112. The extended range battery system 20 may be configured so that the HV battery 28, 66, 102 and the LV battery 30, 68, 112 may not unintentionally transfer energy to each other, as will be discussed hereafter. In another variation, an extended range battery system 20 may utilize DC biasing between a first HV battery 134 and a second HV battery 136, as will be discussed hereafter. The extended range battery system 20 may use any number of power electronic circuits including, but not limited to, boost, buck boost, Quasi-Z-Source inverter, and/or minimal power electronic circuits including, but not limited to, battery exchange circuits.

Figure 2:
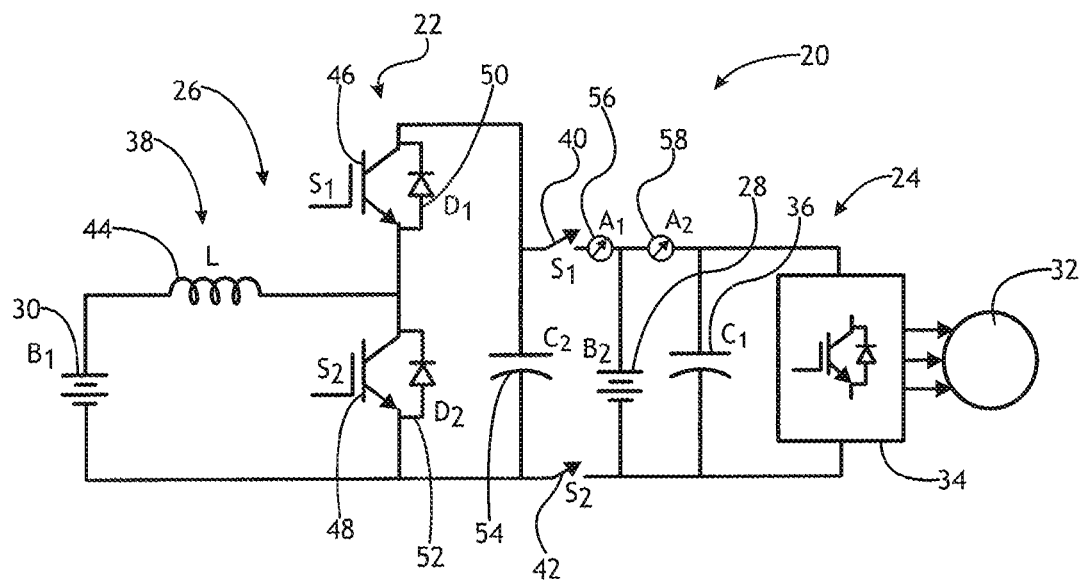
FIG. 2 illustrates a topology of a bi directional buck boost circuit according to a number of variations.

FIG. 2 illustrates a number of variations which may include a topology for an extended range battery system 20 using a bi directional buck boost circuit 22. A bi directional buck boost circuit 22 may allow for the charging or discharging of a primary battery 28 from the motor 32 and the charging or discharging of a secondary battery 30 from the motor 32 which may extend the range of the battery system 20. In a number of variations, the extended range battery system 20 utilizing a bi directional buck boost circuit 22 may include a primary battery system 24 and a secondary battery system 26. The primary battery system 24 may include a primary battery 28, which may be a HV battery, which may be operatively connected to an inverter 34 and at least one energy storage device including, but not limited to, a DC link capacitor 36. In a number of variations, the inverter 34 may convert DC into alternating current (AC). The inverter 34 may be operatively connected to a motor 32. In a number of variations, the primary battery system 24 may be integrated onto the electric bicycle 18.

In a number of variations, the secondary battery system 26 may be operatively connected or disconnected to the primary battery system 24 at a first switch 40 and a second switch 42. In a number of variations, the secondary battery system 26 may include a secondary battery 30, which may be a low voltage battery, which may be operatively connected to a buck boost converter 38. Any number of buck boost converters 38 may be used. In one variation, the buck boost converter 38 may include an inductor 44 which may be operatively connected to the secondary battery 30, a third switch/transistor 46 and a fourth switch/transistor 48. The third and fourth switches/transistors 46, 48 may also each be operatively connected to a first and second negatively biasing diode 50, 52, respectively. The buck boost converter 38 may also include one or more energy storage devices including, but not limited to, one or more capacitors 54, which may run parallel with the one or more energy storage devices 36 operatively connected to the primary battery 28.

In a number of variations, the primary battery 28 may discharge energy to the DC link 36 or may be regenerated/ charged from the DC link 36 and the secondary battery 30 may discharge energy to the DC link 36 or may be regenerated/charged from the DC link 36 through modulation of the third and fourth switches/transistors 46, 48. In a number of variations, the third and fourth switches/transistors 46, 48 may be OFF which may allow the primary battery 28 to discharge energy to the DC link 36. The first negatively biasing diode 50 may prevent energy from the primary battery 28 from unintentionally traveling to the secondary battery 30. The secondary battery 30 may also be a voltage which may be less than the primary battery 28 so that energy from the secondary battery 30 may not unintentionally travel to the primary battery 28. The third and fourth switches 46, 48 may be coupled together and modulated at the same time. Modulating third switch 46 ON may move energy from the primary battery 28 to the secondary battery 30. Modulating the fourth switch ON may allow the secondary battery 30 to transfer energy through the DC link 36 to the motor 70. When the fourth switch/transistor 48 is modulated ON, energy may build up in the inductor 44 creating a high voltage so that when the fourth switch/transistor 48 is modulated OFF the energy from the inductor 44 may travel out to the DC link 36.

In a number of variations, a first sensor 56 may be operatively connected to the buck boost converter 38 and may be used to measure the current from the secondary battery 30. A second sensor 58 may be operatively connected to the primary battery 28 and may be used to measure the current from the primary battery 28. The sensors 56, 58 may be operatively connected to any number of controllers including, but not limited to, a pulse width modulation (PWM) controller. The sensors 56, 58 may provide output proportional to the measured current from the primary battery 28 and the secondary battery 30 to the PWM controller. The PWM controller may then compare the measured values of the current of the primary battery 28 and the secondary battery 30 and may use any number of control logics to modulate the switches 46, 48 based on the measured values.

Figure 3:
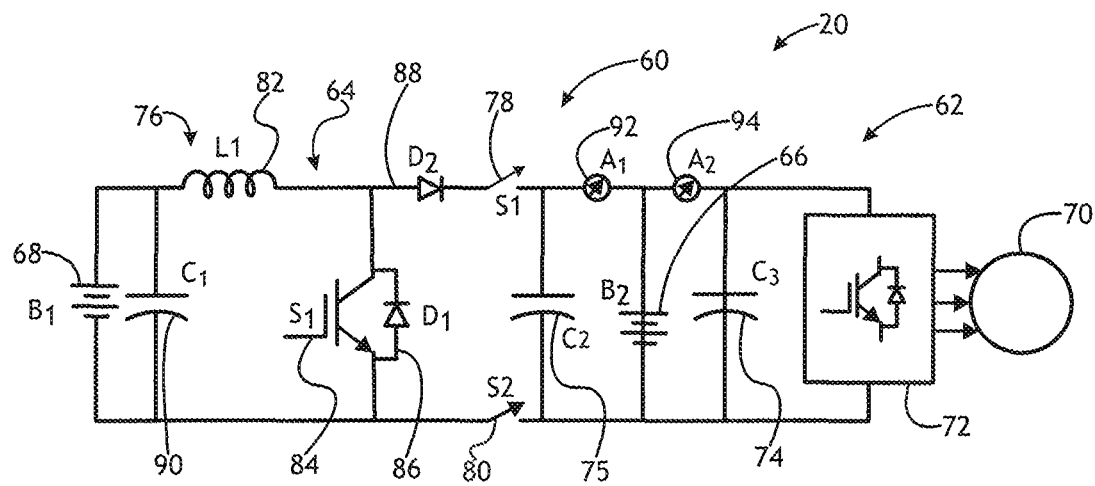
FIG. 3 illustrates a topology of a uni directional boost circuit according to a number of variations.

FIG. 3 illustrates a number of variations which may include a topology for an extended range battery system 20 using a uni directional boost circuit 60. A uni directional boost circuit 60 may allow for the charging or discharging of energy from a primary battery 66 from a motor 70 and the discharging of energy from a secondary battery 68 to the motor 70 which may extend the range of the battery system 20. In a number of variations, an extended range battery system 20 utilizing a uni directional boost circuit 60 may include a primary battery system 62 and a secondary battery system 64. The primary battery system 62 may include a primary battery 66, which may be a HV battery, which may be operatively connected to an inverter 72 and one or more energy storage devices including, but not limited to, one or more DC link capacitors 74, 75. In one variation a first and second capacitor 74, 75 may run in parallel, a variation of which is illustrated in FIG. 3. In another variation, more than two capacitors may be run in parallel. In yet another variation, a single capacitor may be used. The inverter 72 may convert DC into AC and may be operatively connected to a motor 70. In a number of variations, the primary battery system 62 may be integrated onto the electric bicycle 18.

In a number of variations, the secondary battery system 64 may be operatively connected to or disconnected from the primary battery system 62 at a first switch 78 and a second switch 80. In a number of variations, the secondary battery system 64 may include a secondary battery 68, which may be a low voltage battery, which may be operatively connected to a boost converter 76. Any number of boost converters may be used. In one variation, the boost converter 76 may include an inductor 82 which may be operatively connected to the secondary battery 68, a third switch/transistor 84 which may be operatively connected to a first negatively biasing diode 86, and a second negatively biasing diode 88. The boost converter 76 may also include at least one energy storage device including, but not limited to, a third capacitor 90 which may run parallel with the one or more energy storage devices 74, 75 operatively connected to the primary battery 66.

In a number of variations, the third switch 84 may be modulated ON to charge the inductor 82 and may be modulated OFF to discharge energy from the inductor 82 and push energy from the secondary battery 68 into the primary battery 66. The first negatively biasing diode 86 may prevent energy from the primary battery 66 from traveling to the secondary battery 68. When the third switch/transistor 84 is ON, energy may build up in the inductor 82 creating a high voltage so that once the third switch/transistor 84 is turned OFF the energy from the inductor 82 may travel out to the DC link 74, 75. In a number of variations, the secondary battery 68 may include a voltage which may be lower than the primary battery 66 so that current from the secondary battery 68 may not naturally travel to the primary battery 66.

In a number of variations, a first sensor 92 may be operatively connected to the boost converter 76 and may be used to measure the current of the secondary battery 68. A second sensor 94 may be operatively connected to the primary battery 66 and may be used to measure the current of the primary battery 66. The sensors 92, 94 may be operatively connected to any number of controllers including, but not limited to, a pulse width modulation (PWM) controller. The sensors 92, 94 may provide output proportional to the measured current from the primary battery 66 and the secondary battery 68 to the PWM controller. The PWM controller may then compare the measured values of the current of the primary battery 66 and the secondary battery 68 and may use any number of control logics to modulate the third switch 84 based on the measured values.

Figure 4:
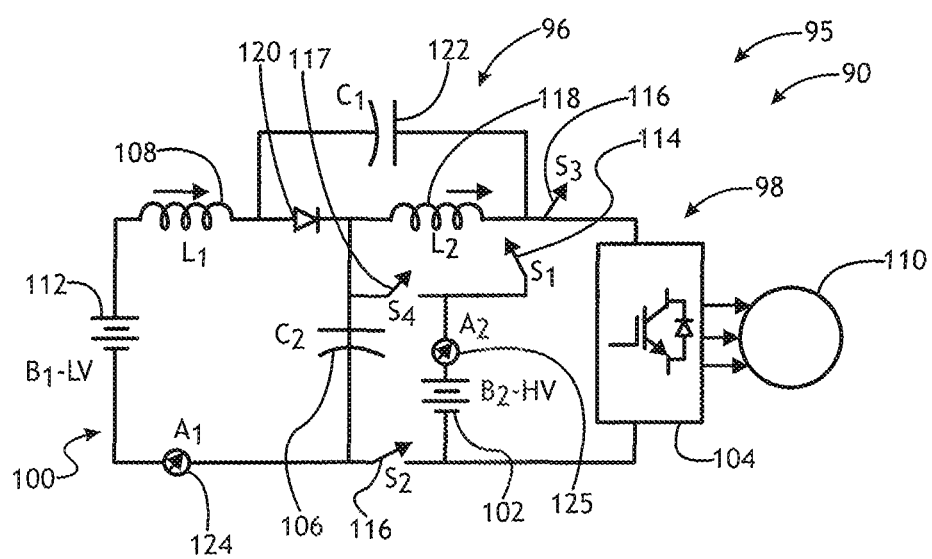
FIG. 4 illustrates a topology of a Quasi-Z-Source inverter circuit according to a number of variations.

FIG. 4 illustrates a single stage circuit topology 95 for an extended range battery system using a Quasi-Z-Source inverter circuit 96. In a number of variations, the Quasi-Z-Source inverter circuit 96 may include a primary battery system 98 and a secondary battery system 100. The primary battery system 98 may include a primary battery 102, which may be a HV battery, which may be operatively connected to an inverter bridge 104 and a motor 110. In a number of variations, the primary battery system 98 may be integrated onto the electric bicycle 18. The inverter bridge 104 may allow for the discharging of energy from the primary battery 102 through the motor 110, while charging may be allowed using the Quasi-Z-Source inverter circuit 96 and an input energy source including, but not limited to a secondary battery 112.

In a number of variations, the secondary battery system 100 may be operatively connected to or disconnected from the primary battery system 98 at a first switch 114, a second switch 115, a third switch 116, and a fourth switch 117. In a number of variations, the secondary battery system 100 may include a secondary battery 112, which may be a low voltage battery, which may be operatively connected to the input of the Quasi-Z-Source inverter circuit 96. In a number of variations, the Quasi-Z-Source inverter circuit 96 includes a first inductor 108 which may be operatively connected to the secondary battery 112, a diode 120 operatively connected to the first inductor 108 and a second inductor 118. A first energy storage device LV capacitor 122, may be operatively connected to the first inductor 108 and the second inductor 118. The Quasi-Z-Source inverter circuit 96 may also include a second energy storage device HV capacitor 106 which may be operatively connected to the secondary battery 112, the diode 120, and the second inductor 118. In a number of variations, the primary battery 102 may be operatively connected to the Quasi-Z-Source inverter circuit 96 high voltage capacitor 106, where the diode 120 and the low voltage capacitor 122 prevent the current from flowing into the secondary battery 112. In a number of variations, the Quasi-Z-Source inverter circuit 96 may allow for the discharging of energy from the secondary battery 112 to the motor 110.

In a number of variations, a first current sensor 124 may be operatively connected to the Quasi-Z-Source inverter circuit 96 and may be used to measure the current of the secondary battery 112. A second sensor 125 may be operatively connected to the primary battery 102 and may be used to measure the current of the primary battery 102. The sensors 124, 125 may be operatively connected to any number of controllers including, but not limited to, a pulse width modulation (PWM) controller. The sensors 124, 125 may provide output proportional to the measured current from the primary battery 102 and the secondary battery 112 to the PWM controller. The PWM controller may then compare the measured values of the current of the primary battery 102 and the secondary battery 112 and may use any number of control logics to modulate the switches 114, 115 based on the measured values.

Figure 5:
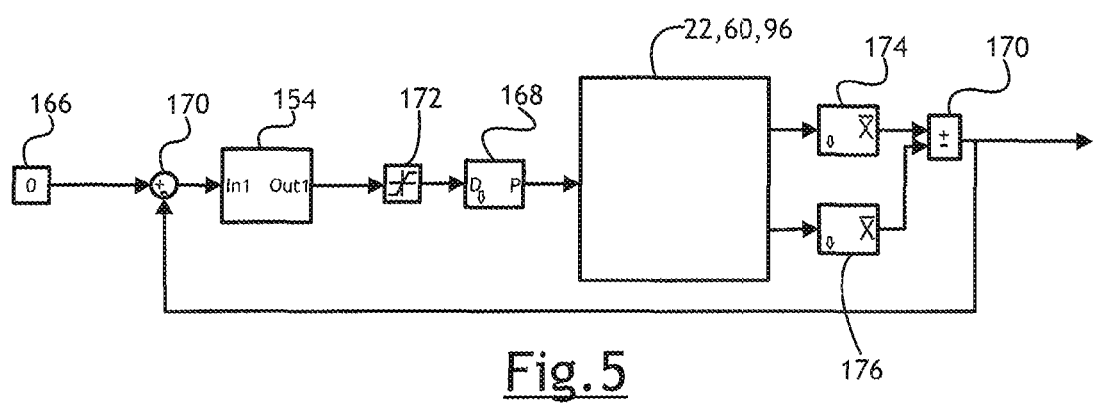
FIG. 5 illustrates a control system for an extended range battery system according to a number of variations.

FIG. 5 illustrates a number of variations which may include a control command 166 for current sourcing from an extended range battery system 20 as illustrated in FIGS. 2-4. In a number of variations, a first sensor 56, 92, 124 operatively connected to the primary battery 28, 66, 102 in the circuit 22, 60, 96 may measure the current of the primary battery 28, 66, 102 and provide an average current of the DC link 174. A second sensor 58, 94, 125 may be operatively connected to the secondary battery 30, 68, 112 in the circuit 22, 60, 96 to measure the current of the secondary battery 30, 68, 112 and may provide an average current of the secondary battery 176. The average current from the DC link 174 and the average current from the secondary battery 176 may then be subtracted to provide the primary battery current 170. The primary battery current 170 may then be used for feed back and subtracted from the command 166 to calculate error 170. The error 170 is fed to the controller 154 which determines the duty cycle of the switches 46, 48, 84, 114, 115. The duty cycle is allowed to range between 0% to 99% and is limited to this range by using a saturation block 172. The duty cycle is then converted into a gating PWM cycle 168 and sent to the physical switch cycle control, and the circuit 22, 60, 96 is then modulated based on the duty cycle from the PWM generator 168. If the currents are the correct ratio, the PWM controller 154 may continue to operate the extended range battery system 20 without changes to the modulation of the switches/transistors 46, 48, 84, 114, 115. If the current is different, then the PWM controller 154 may perform one or more commands to modify the modulation of the switches/transistors 46, 48, 84, 114, 115 with the PWM generator 168, controller 154, and saturation block 172, so that the battery 28, 30, 66, 68, 102, 112 sending or receiving energy to the motor 32, 70, 110 may be switched. This may ensure that the extended range battery system 20 is utilizing the primary battery 28, 66, 102 and the secondary battery 30, 68, 112 efficiently.

A control logic chart for an extended range battery system 20 as illustrated in any of FIGS. 2-4 based on various measured state of charges (SOC) of the primary battery 28, 66, 102 and the secondary battery 30, 68, 112 is illustrated below:

| LV Battery | LV Battery SOC | HV Battery SOC (Primary) | Condtion | DC/DC State -- % of current to/from Primary Battery |
|---|---|---|---|---|
| Installed | >90% | >90% | Motoring | 100% |
| Installed | >90% | 90% to 20% | Motoring | 100% |
| Installed | >90% | <20% | Motoring | 0% |
| Installed | 90% to 20% | >90% | Motoring | 100% |
| Installed | 90% to 20% | 90% to 20% | Motoring | 100% |
| Installed | 90% to 20% | <20% | Motoring | 0% |
| Installed | <20% | >90% | Motoring | 100% |
| Installed | <20% | 90% to 20% | Motoring | 100% |
| Installed | <20% | <20% | Motoring | 100% |
| Installed | >90% | >90% | Generating | 50% to each battery until 95% SOC reached |
| Installed | >90% | 90% to 20% | Generating | 100% |
| Installed | >90% | <20% | Generating | 100% |
| Installed | 90% to 20% | >90% | Generating | 0% |
| Installed | 90% to 20% | 90% to 20% | Generating | 100% power to battery of lower SOC |
| Installed | 90% to 20% | <20% | Generating | 100% |
| Installed | <20% | >90% | Generating | 0% |
| Installed | <20% | 90% to 20% | Generating | 0% |
| Installed | <20% | <20% | Generating | 0% |

The above control logic chart is configurable and may vary based upon the design parameters and/or application of a particular extended range battery system 20.

Figure 6:
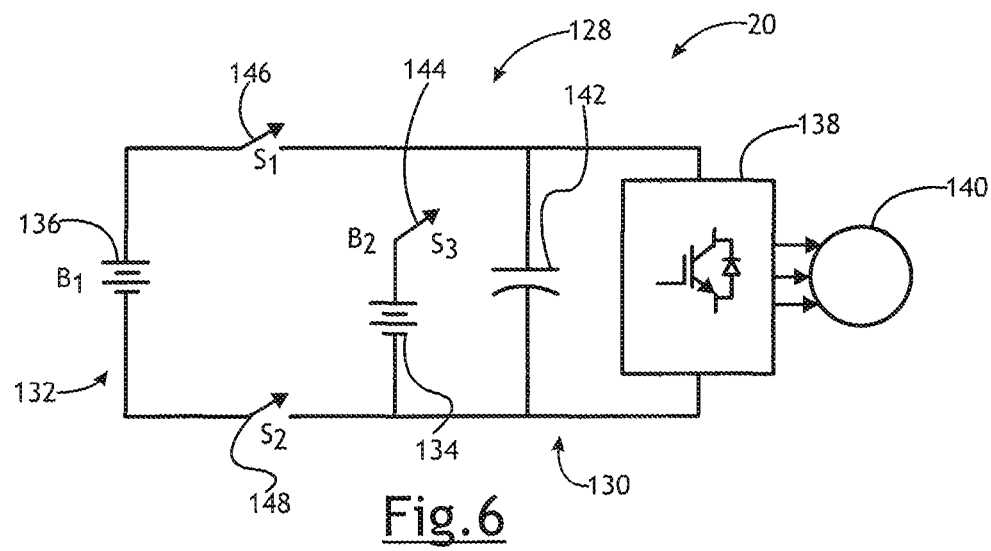
FIG. 6 illustrates a topology of a battery exchange circuit according to a number of variations.

FIG. 6 illustrates a number of variations which may include a battery exchange circuit 128 for an extended range battery system 20. In a number of variations, the extended range battery system 20 utilizing a battery exchange circuit 128 may include a primary battery system 130 and secondary battery system 132. The primary battery system 130 may include a primary battery 134, which may be a HV battery, and may be operatively connected to at least one energy storage device including, but not limited to, a DC link capacitor 142, a first switch 144, and an inverter 138. The inverter 138 may be operatively connected to a motor 140. The primary battery system 130 may be integrated onto the electric bicycle 18. The secondary battery system 132 may include a secondary battery 136, which may also be a HV battery, and may be operably connected to or disconnected from the primary battery system 130 at a second switch 146 and a third switch 148.

In a number of variations, the primary battery 134 may be operatively connected to the first switch 144 and the secondary battery 136 may be operatively connected to the second and third switches 146, 148 so that the switches 144, 146, 148 may be modulated so that energy to the motor 140 may alternate between the first battery 134 and the secondary battery 136 which may increase the length of operation of the extended range battery system 20. In a number of variations, the source of energy to the motor 140 may be switched between the first battery 134 and the secondary battery 136 when the voltage of the batteries 134, 136 is within a predetermined range in order to avoid overloading either of the batteries 134, 136 by the other 134, 136 which may have a higher voltage. In a number of variations, a battery exchange circuit 128 may have a reduced weight than those utilizing a HV battery and a LV battery.

Figure 7:
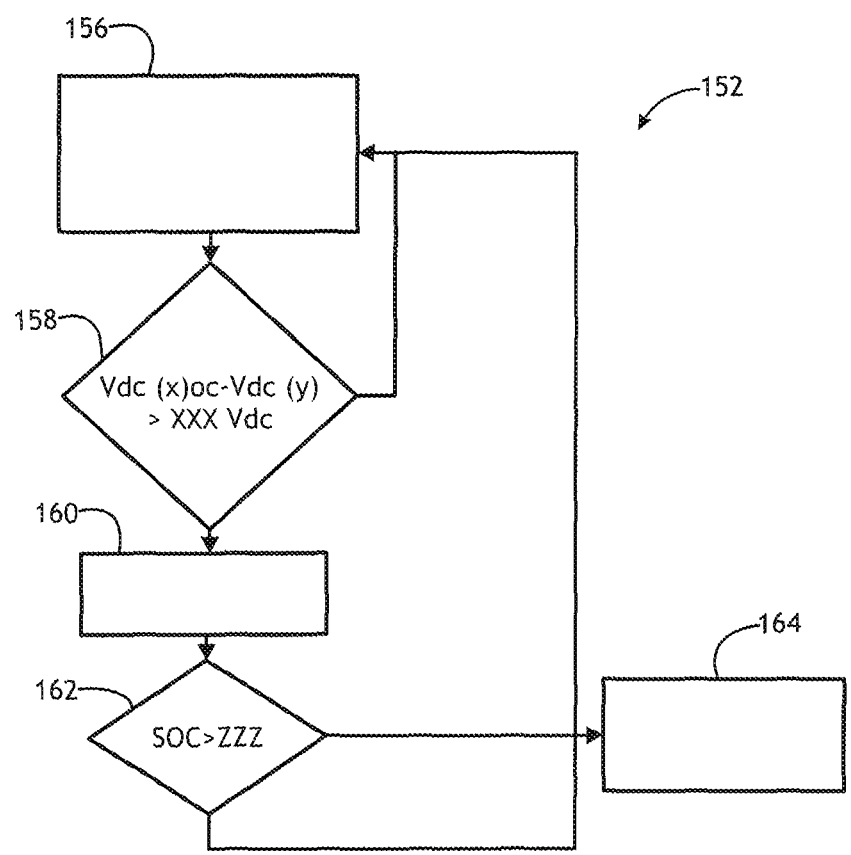
FIG. 7 illustrates a control strategy for a battery exchange circuit according to a number of variations.

A control strategy for a battery exchange circuit 128 as illustrated in FIG. 6, when the battery selection criteria by a user is set to allow for either the primary battery 134 or the secondary battery 136 to send energy to the motor, as illustrated in FIG. 7 is illustrated below:

charge (SOC) is >ZZZ, wherein ZZZ is a predetermined programmable value. If YES, then go back to the first step 156. If NO, then go to the fifth step 164 which is to send energy to the motor by whichever battery (primary or secondary) is specified by the user.

The following description of variants is only illustrative of components, elements, acts, products and methods considered to be within the scope of the invention and are not in any way intended to limit such scope by what is specifically disclosed or not expressly set forth. The components, elements, acts, products and methods as described herein

|  |  | SOC |  | Temp |  |  |  |
| --- | --- | --- | --- | --- | --- | --- | --- |
| Battery X | Battery 1 | Battery X | Battery 1 | Battery X | Battery 1 | Battery X | Notes |
| installed | >90% | >90% | OK | OK | either | either | use 1 or other . . . generally prefer to match Battery X |
| installed | >90% | 90% to 20% | OK | OK | either | either | use 1 or other . . . generally prefer to match Battery X |
| installed | >90% | <20% | OK | OK | on | off |  |
| installed | 90% to 20% | >90% | OK | OK | either | either | use 1 or other . . . generally prefer to match Battery X |
| installed | 90% to 20% | 90% to 20% | OK | OK | either | either | use 1 or other . . . generally prefer to match Battery X |
| installed | 90% to 20% | <20% | OK | OK | on | off |  |
| installed | <20% | >90% | OK | OK | off | on |  |
| installed | <20% | 90% to 20% | OK | OK | off | on |  |
| installed | <20% | <20% | OK | OK | off | on | split time between until voltage is decreased too low |
| installed | <10% | <10% | OK | OK | either | either |  |
| installed |  |  | LOW | LOW | either/on | either/on | parallel modulate voltages & currents based on battery current available . . . |
| installed |  |  | HIGH | OK | off | on | unless SOC is too low on battery X |
| installed |  |  | OK | HIGH | on | off | unless SOC is too low on battery 1 |

In a number of variations, the DC voltage and/or SOC of a primary battery 134 and a secondary battery 136 may be monitored so that the battery 134, 136 with the highest open circuit DC voltage will be used to supply energy to the system 20 if the SOC condition is met. The primary battery 134 and the secondary battery 136 may continue to alternate until the batteries 134, 136 are each drained. The above control logic chart is configurable and may vary based upon the design parameters and/or application of a particular extended range battery system 20.

In a number of variations, if the temperature of the primary battery 134 is low, the primary battery 134 and the secondary battery 136 may be run in parallel and the currents may be modulated.

FIG. 7 illustrates a number of variations which may include a control strategy 152 for a battery exchange circuit 128 using battery swapping as discussed above. In this control strategy 152, use of either the primary battery or the secondary battery is possible. The first step 156 is to select the battery with the highest open circuit DC voltage to supply energy to the motor, wherein the battery with the highest open circuit DC voltage is Vdc(y). The second step 158 is to determine whether Vdc(x) oc−Vdc(y)>XXX Vdc, wherein XXX Vdc is a predetermined programmable value. If NO, then go back to step 1. If YES, go to the third step 160 which is to switch which battery sends energy to the motor. The fourth step 162 determines whether the state of may be combined and rearranged other than as expressly described herein and still are considered to be within the scope of the invention.

Variation 1 may include a product comprising: an extended range battery system for an electric bicycle comprising a first battery system and a second battery system, and wherein direct current biasing is utilized between the first battery system and the second battery system to extend the range of the extended range battery system.

Variation 2 may include a product as set forth in Variation 1 wherein the first battery system is integrated onto the electric bicycle and the second battery system is removably attached to the first battery system and the electric bicycle.

Variation 3 may include a product as set forth in any of Variations 1-2 wherein the first battery system further comprises a high voltage battery and the second battery system further comprises a low voltage battery.

Variation 4 may include a product as set forth in any of Variations 1-3 wherein the low voltage battery has a voltage which is less than the high voltage battery so that energy from the low voltage battery does not naturally travel to the high voltage battery.

Variation 5 may include a product as set forth in any of Variations 1-4 wherein the high voltage battery is operatively connected to a negatively biasing diode to prevent an unintended energy transfer from the high voltage battery to the low voltage battery.

Variation 6 may include a product as set forth in any of Variations 1-5 wherein the extended range battery system comprises a bi directional buck boost circuit and wherein the bi directional buck boost circuit is constructed and arranged to allow controlled energy transfer for at least one of discharging energy from the high voltage battery to the DC link, recharging of the high voltage battery from the DC link, discharging energy from the low voltage battery to the DC link, or charging of the low voltage battery from the DC link.

Variation 7 may include a product as set forth in any of Variations 1-5 wherein the extended range battery system comprises a uni directional boost circuit, and wherein the uni directional boost circuit is constructed and arranged to allow for controlled energy transfer for at least one of discharging energy from the high voltage battery to a DC link, charging the high voltage battery from the DC link, or discharging energy from the low voltage battery to the DC link.

Variation 8 may include a product as set forth in any of Variations 1-5 wherein the extended range battery system comprises a Quasi-Z-Source inverter circuit, and wherein the Quasi-Z-Source inverter circuit is constructed and arranged to allow for discharging of both the high voltage battery and the low voltage battery simultaneously to a motor, charging of the high voltage battery from one of an inverter or the low voltage battery, and full discharge of the low voltage battery to the motor.

Variation 9 may include a product as set forth in any of Variations 1-2 wherein the first battery system further comprises a first high voltage battery and the second battery system further comprises a second high voltage battery.

Variation 10 may include a product as set forth in any of Variations 1-2 and 9 wherein the extended range battery system comprises a battery exchange circuit, and wherein the battery exchange circuit is constructed and arranged so that energy to a motor is alternated between the first high voltage battery and the second high voltage battery based on a state of charge and a DC voltage of the first high voltage battery and the second high voltage battery.

Variation 11 may include a method for an extended range battery system for an electric bicycle comprising utilizing direct current biasing between a first battery system and a second battery system to extend the range of the extended range battery system.

Variation 12 may include a method as set forth in Variation 11 wherein the first battery system further comprises a high voltage battery which is operatively connected to a first sensor and wherein the second battery system further comprises a low voltage battery which is operatively connected to a second sensor.

Variation 13 may include a method as set forth in any of Variations 11-12 wherein energy to the motor is alternated between the high voltage battery and the low voltage battery based on whether the high voltage battery or the low voltage battery has a higher state of charge and dc voltage.

Variation 14 may include a method as set forth in any of Variations 11-13 wherein the extended range battery system includes one of a bi directional buck boost circuit, a uni directional boost circuit, or a Quasi-Z-Source inverter circuit.

Variation 15 may include a method as set forth in any of Variations 11-13 further comprising controlling the extended range battery system comprising: monitoring a first current of the high voltage battery with the first sensor; monitoring a second current of the low voltage battery with the second sensor; sending a first signal output from the first sensor and a second signal output from the second sensor to a controller; processing the first signal output and the second signal output to a control logic in the controller; and modulating at least one switch in the extended range battery system based on the control logic to control whether energy transfer to or from a motor comes from the high voltage battery or the low voltage battery.

Variation 16 may include a method as set forth in Variation 11 wherein the first battery system further comprises a first high voltage battery which is operatively connected to a first sensor and wherein the second battery system further comprises a second high voltage battery which is operatively connected to a second sensor.

Variation 17 may include a method as set forth in any of Variations 11 and 16 wherein the extended range battery system includes a battery exchange circuit.

Variation 18 may include a method as set forth in any of Variations 11 and 16-17 wherein if the temperature of the first high voltage battery is low, the first high voltage battery and the second high voltage battery are run in parallel and currents of the first high voltage battery and the second high voltage battery are modulated.

Variation 19 may include a method as set forth in any of Variations 11 and 16-18 wherein energy to a motor alternates between the first high voltage battery and the second high voltage battery when voltages of the first and the second high voltage battery are within a predetermined range to avoid overloading of either the first battery or the second battery.

Variation 20 may include a method as set forth in any of Variations 11 and 16-19 further comprising a control method for the extended range battery system comprising: setting battery selection of the extended range battery system to either the first high voltage battery or the second high voltage battery; monitoring at least one of a first DC voltage or a first SOC of the first high voltage battery with the first sensor; monitoring at least one of a second DC voltage or a second SOC of the second high voltage battery with the second sensor; sending a first output signal of at least one of the first DC voltage or the first SOC from the first sensor and a second output signal of at least one of the second DC voltage or the second SOC from the second sensor to a controller; processing the first output signal and the second output signal into a control logic in the controller to determine whether the first battery or the second battery has a highest open circuit DC voltage; and modulating a switch to supply energy to a motor from the first or the second battery with the highest open circuit DC voltage.

The above description of select variations within the scope of the invention is merely illustrative in nature and, thus, variations or variants thereof are not to be regarded as a departure from the spirit and scope of the invention.

What is claimed is:

1. A method for an extended range battery system for an electric bicycle comprising utilizing direct current biasing between a first battery system and a second battery system to extend a range of the extended range battery system comprising:
    providing the electric bicycle with the first battery system and the second battery system, wherein the first battery system comprises a high voltage battery and the second battery system comprises a low voltage battery;
    operatively connecting a first sensor to the high voltage battery and operatively connecting a second sensor to the low voltage battery;
    monitoring a first current of the high voltage battery with the first sensor;
    monitoring a second current of the low voltage battery with the second sensor;

sending a first signal output from the first sensor and a second signal output from the second sensor to a controller;

processing the first signal output and the second signal output to a control logic in the controller; and modulating at least one switch in the extended range battery system based on the control logic to alternate whether energy transfer to or from a motor comes from the first battery system or the second battery system.

2. The method of claim 1 wherein energy to the motor is alternated between the high voltage battery and the low voltage battery based on whether the high voltage battery or the low voltage battery has a higher state of charge and dc voltage.

3. The method of claim 1 wherein the extended range battery system includes one of a bi directional buck boost circuit, a uni directional boost circuit, or a Quasi-Z-Source inverter circuit.

\* \* \* \* \*